US010635721B2

(12) United States Patent
Chen et al.

(10) Patent No.: US 10,635,721 B2
(45) Date of Patent: Apr. 28, 2020

(54) DOCUMENT RECOMMENDATION

(71) Applicant: EMC Corporation, Hopkinton, MA (US)

(72) Inventors: Tao Chen, Beijing (CN); Baoyao Zhou, Beijing (CN); Yu Cao, Beijing (CN); Xiaoyan Guo, Beijing (CN); Qianjie Zhong, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 971 days.

(21) Appl. No.: 14/310,468

(22) Filed: Jun. 20, 2014

(65) Prior Publication Data

US 2014/0379618 A1   Dec. 25, 2014

(30) Foreign Application Priority Data

Jun. 21, 2013 (CN) .......................... 2013 1 0262708

(51) Int. Cl.
*G06F 16/93* (2019.01)
(52) U.S. Cl.
CPC ................................. *G06F 16/93* (2019.01)
(58) Field of Classification Search
CPC ...................................................... G06F 16/93
See application file for complete search history.

(56) References Cited

U.S. PATENT DOCUMENTS

| | | | |
|---|---|---|---|
| 8,175,989 B1* | 5/2012 | Gopinath | G06N 7/005 706/45 |
| 8,200,683 B2* | 6/2012 | Gupta | G06F 17/3053 707/748 |
| 8,200,687 B2* | 6/2012 | Gupta | G06F 17/30867 707/767 |
| 2013/0046651 A1* | 2/2013 | Edson | G06Q 30/0255 705/26.4 |
| 2013/0204825 A1* | 8/2013 | Su | G06N 5/04 706/46 |
| 2013/0290110 A1* | 10/2013 | LuVogt | G06F 17/30867 705/14.66 |
| 2013/0290339 A1* | 10/2013 | LuVogt | G06F 17/30867 707/740 |
| 2013/0290905 A1* | 10/2013 | LuVogt | G06N 3/006 715/835 |
| 2014/0379618 A1* | 12/2014 | Chen | G06F 17/30011 706/12 |

* cited by examiner

*Primary Examiner* — Daniel C Puentes
(74) *Attorney, Agent, or Firm* — Brian J. Colandreo; Mark H. Whittenberger; Holland & Knight LLP

(57) ABSTRACT

Embodiments of the present disclosure provide a method and apparatus for document recommendation by obtaining a plurality of first data for a source recommendation task from activities related to a source user using a plurality of first documents; obtaining a plurality of second data for a target recommendation task from activities related to a target user using a plurality of second documents; performing the target recommendation task based on the plurality of first data, the plurality of second data, and knowledge transferred from the source recommendation task to obtain a target recommendation model; and conducting document recommendation to the target user using the target recommendation model.

11 Claims, 5 Drawing Sheets

DOCUMENT RECOMMENDATION

RELATED APPLICATION

This application claims priority from Chinese Patent Application Serial No. CN201310262708.X filed on Jun. 21, 2013 entitled "Method and Apparatus for Document Recommendation," the content and teachings of which are hereby incorporated by reference in their entirety.

FIELD OF THE INVENTION

Embodiments of the present disclosure generally relate to the field of document recommendation, and more specifically to document recommendation techniques based on transfer learning.

BACKGROUND OF THE INVENTION

Document recommendation is an essential constituent in a user-oriented content management system. Accurate document recommendation may potentially enhance users' working efficiency and improve user experience, such as for web browsing, call center operations etc. The construction of user's hobbies or preferences is automated by integrating information obtained from the user's activities, such as browsing histories, call record history, etc. When a new user has insufficient historical data, the main challenge for such a recommendation system is how to conduct personalized recommendation for the new user, which is typically referred to as a cold start problem.

Traditional document recommendation approaches always depends on document contents, user information, such as explicit or implicit user feedbacks, user's profiles, and sometimes uses help of semantic analysis via a thesaurus. Another approach is collaborative filtering (CF), which is widely used for web recommendation. The CF approach can make recommendations by computing similarity or correlation between items from among user's activity logs. A key issue with the CF approach is on defining a correlation function (or a distance function) between users and documents. It becomes relatively cumbersome and difficult to accurately construct the correlation function when few data points are available. Thus, the above two approaches cannot effectively overcome the cold start problem.

SUMMARY OF THE INVENTION

In view of the above mentioned problems, various exemplary embodiments of the present disclosure provide a document recommendation method based on transfer learning. This method can make an accurate document recommendation to new users through transfer learning, which thereby effectively overcomes the cold start problem.

According to one aspect of the present disclosure, a method for document recommendation is provided, which comprises: obtaining a plurality of first data for a source recommendation task from activities related to a source user using a plurality of first documents; obtaining a plurality of second data for a target recommendation task from activities related to a target user using a plurality of second documents; performing the target recommendation task based on the plurality of first data, the plurality of second data, and knowledge transferred from the source recommendation task to obtain a target recommendation model; and conducting document recommendation to the target user using the target recommendation model.

According to a further aspect of the present disclosure, an apparatus for document recommendation is provided, which comprises: an obtaining module configured to obtain a plurality of first data for a source recommendation task from activities related to a source user using a plurality of first documents, and to obtain a plurality of second data for a target recommendation task from activities related to a target user using a plurality of second documents; a processing module configured to perform the target recommendation task based on the plurality of first data, the plurality of second data, and knowledge transferred from the source recommendation task to obtain a target recommendation model; and an outputting module configured to conduct document recommendation to the target user using the target recommendation model, and to output a document recommendation result. The obtaining module, processing module and outputting module may exist as separate entities or in combination or as a single module, either as software or hardware or a combination thereof.

BRIEF DESCRIPTION OF THE SEVERAL VIEWS OF THE DRAWINGS

Features, advantages, and other aspects of various embodiments of the present disclosure will become more apparent through the following detailed description with reference to the accompanying drawings, and several embodiments of the present disclosure are depicted herein in an exemplary, non-limiting manner. In the accompanying drawings.

DETAILED DESCRIPTION

Figure 1A:
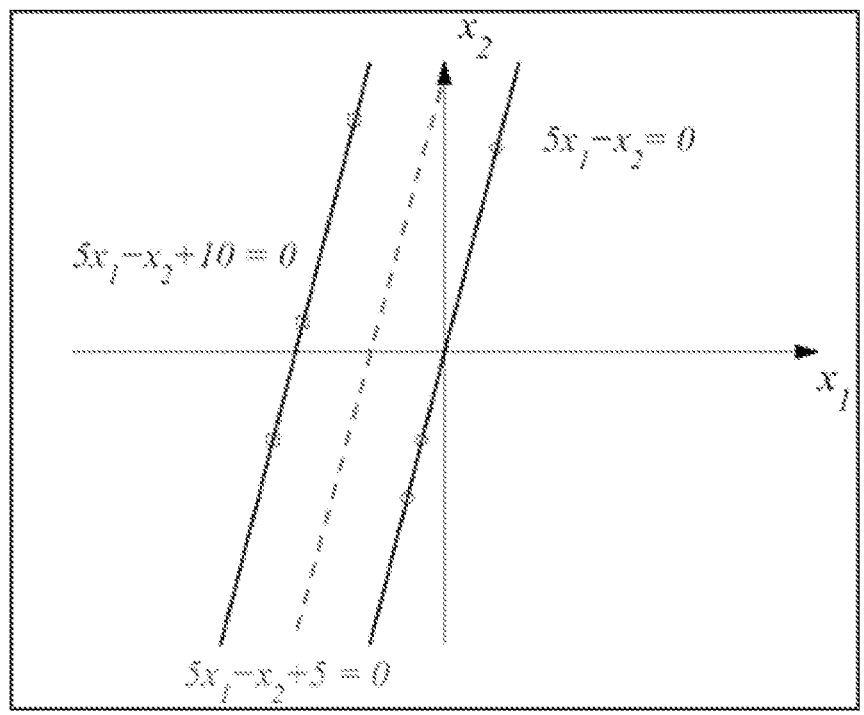
FIGS. 1A and 1B show examples of a transfer learning result obtained through a method according to an embodiment of the present disclosure.

Hereinafter, various exemplary embodiments of the present disclosure will be depicted in detail with reference to the drawings.

It should be understood that these exemplary embodiments are provided only to enable those skilled in the art to better understand and further implement the present invention, and should not be construed by any means to limit the scope of the present disclosure.

According to the embodiments of the present disclosure, there is provided a document recommendation method for combining document content and collaborative data in a transfer learning framework.

Transfer learning is an improvement over traditional machine learning. Within the framework of traditional machine learning, a learning task includes learning a classification model based on given sufficient training data; and then the learned model is used to classify and predict test documents. However, for a new field, where relatively large amounts of training data can hardly be obtained, and in a scenario where training data and test data do not conform to the same data distribution, such a learning and application cannot be conducted/performed. In contrast, transfer learning may transfer necessary knowledge from existing data to assist the learning task in a new or different environment. Therefore, the transfer learning may overcome the cold start problem without the large amounts of data from the new environment, for example, when conducting document recommendation to a user newly added into the document recommendation system.

However, in the previous transfer learning method, since different learning tasks may result in different prediction vectors, the previous methods are based on modeling relationship of the prediction vectors $w_S$ and $w_T$ for a source domain S and a target domain T. For example, known from prior art, the prediction parameters w for every task are divided into two terms: a common parameter $w_0$ and a task-specific term v. A support vector machine (SVM) is extended to regularize both of the terms; and then knowledge circulation is achieved through the common parameter. However, such a transfer learning method is not appropriate for a situation where the source domain S and the target domain T may have completely opposite preferences on some features. For example, in a text classification project, both Marc and Bruno take Technology Space information as a determinant factor for deciding whether to accept the notification to access a document or not. Marc likes to read about notifications on "xCP technical" space while Bruno likes to read about notifications on "Enterprise Engineering" space. In this situation, if a classifier trained by Marc's data is directly applied, then it may be expected that those notifications on the xCP technical space will be recommended to Bruno, which would cause a wrong classification. However, for example, if it is understood that the document recommendation system is more likely to notify the space name and author name from the Marc's data, then which space and which author Bruno is interested would be known by merely using several data (maybe one click) from assessment of Bruno, and then prediction can be made by using those few available data.

In the traditional transfer learning, equal importance would always be set on categorical variables, although people might have opposite interests in categorical contents. For example, when people read scientific papers, compared with the body content of the paper, the variable "author" may be a key factor for the readers to decide whether they will continue to read this paper; therefore, the variable "author" in different domains may be set with the same importance; however, since different people have different research preferences, different people may be attracted by different authors. Therefore, the embodiments of the present disclosure propose to transfer "subspace importance" as the common knowledge shared by the source domain (which may be regarded as an old user in the present disclosure) and the target domain (which may be regarded as a new user in the present disclosure). The subspace importance is information prevalent in many types of documents (for example, research papers, news articles, blogs, twitter, etc.).

The document recommendation method based on transfer learning sufficiently utilizes the knowledge obtained from the old user(s) to improve recommendation to for a new user(s). The document recommendation method according to the embodiments of the present disclosure may comprise two phases: offline model learning phase and online recommendation phase. In the offline model learning phase, a regularized transfer learning model is trained based on relatively large (hereinafter also referred to as massive) legacy data and limited data from a new user; then in an online recommendation phase, the regularized transfer learning model is used to rank the documents for recommendation to the new user.

According to the embodiments of the present disclosure, a document recommendation task is normalized as a regularized transfer learning problem, wherein the consistent subspace importance is represented by a constraint used for optimizing an objective function, which is referred to as consistency subspace constraint. The parameters in the offline model learning phase are obtained by solving the optimization problem. With the learned parameters, the documents may be labeled as "recommended" and "not recommended"; and additionally, different recommendation priorities may be presented to users by recommendation scores.

Hereinafter, exemplary depictions will be made to the offline model learning phase and the online recommendation phase, respectively.

Offline Model Learning Phase

As examples, instead of limiting the present disclosure, the problem of binary classification within the transfer learning framework is considered in various embodiments of the present disclosure. However, those skilled in the art should understand that the present disclosure is also applicable to other classification problems within the transfer learning framework.

The transfer learning is an improvement on learning in a new task through the transfer of knowledge from a related task that has already been learned. The task in the following text may be understood as training for a learning model or training for a classifier, and the ultimate purpose is to obtain a recommendation model for recommending documents to users.

Assume that a new task is the target task T, and a dataset for the target task is denoted as $D_T = \{x_{T_j}, y_{T_j}\}_{j=1}^{n_T}$; a relevant task is referred to as the source task S, and a dataset for the source task S is denoted as $D_S = \{x_{S_j}, y_{S_j}\}_{j=1}^{n_S}$. In various embodiments of the present disclosure, all data for various tasks come from the same space $\chi \times Y$ where $\chi = R^m$, which denotes the whole eigenvector space of each task, and $Y = \{-1, +1\}$; $x_{T_j}$ denotes an eigenvector for the target task T; $x_{S_j}$ denotes an eigenvector for the source task S, and $x_{T_j}$, $x_{S_j} \in \chi$, $y_{T_j}, y_{S_j} \in Y$, and $y_{T_j}, y_{S_j} = \{-1, +1\}$, wherein, for example, +1 represents "recommended,"−1 represents "not recommended." However, it should be understood that the value of y is not limited to −1 and +1. Any values that may achieve the objective for recommendation are applicable to the present disclosure. $n_T$ and $n_S$ denote the numbers of data for the target task and the source task, respectively, for example, the number of available documents in each task. In each task, it is required to learn a target prediction function $f_S(x)$ (or $f_T(x)$) from the training data, such that $y_{S_j} \approx f_s(x_{S_j})$ and $y_{T_j} \approx f_s(x_{T_j})$.

According to the embodiments of the present disclosure, implementation is addressed through simplifying the transfer learning problem as the classification problem of the regularized support vector machine (SVM). For the sake of simplicity, instead of limitation, in this specification, for each task $t \in \{S,T\}$ an SVM linear classifier is considered. But it should be understood that the present invention is not limited to the SVM linear classifier.

Without loss of generality, it is assumed that the input data for each task may be expressed as $x = (x_1^{C=1}, x_2^{C=1}, \ldots, x_{n_1}^{C=1}; x_1^{C=2}, x_2^{C=2}, \ldots, x_{n_2}^{C=2}; \ldots; x_1^{C=c}, x_2^{C=c}, \ldots, x_{n_c}^{C=c})$. The input data is obtained from users' activities of using documents. When the data is used for a training task of the classifier, it is required to extract an eigenvector from the obtained data. There is a plurality of approaches for extracting the eigenvector. As an example, each dimension in the eigenvector indicates a certain keyword. If this keyword appears in the document, then the dimension value is 1, otherwise 0. Again for example, if a document has two keywords, wherein the first keyword appears (regardless of how many times), while the second does not appear, then the eigenvector extracted from this document is [1, 0]. In a further example, assuming that a document has two keywords, wherein the first keyword appears twice in the document, while the second keyword does not appear, the eigenvector extracted from this document may be expressed as [2, 0], etc. It should be understood that other approaches for extracting eigenvectors from document-related data are also applicable to the present disclosure.

The data obtained from the users' activities of using documents or the extracted eigenvector may be divided into a plurality of subspaces, wherein the subspaces are expressed as C in the aforementioned x, C representing subspaces from 1 to c. Dividing data into a plurality of subspaces may be implemented through the following manner: for example, for one document, its caption may be classified into a subspace, its abstract may be classified into another subspace, and its body may be classified into yet another subspace; therefore, the document-related data may be divided into three subspaces (C=3 subspaces). However, it should be understood that the dividing manners used in the present disclosure are not limited to the above. Based on the importance of subspaces, the "caption" subspace may be set to C=1, the "abstract" subspace may be set to C=2, and the "body" subspace may be set to C=3, respectively. $n_i$ in the above x expression denotes the number of dimensions of each subspace indexed by i, i.e., the number of features extracted from the subspace. Hereinafter, x is used to represent the eigenvector generated from the data obtained from the activities of using documents.

It is assumed that the SVM linear classifier is used for the source task S and the target task T, then the function $f_t$ for the task t($t \in \{S,T\}$) is a hyperplane-based function, i.e., $$f_t(x) = \text{sign}(w_t \cdot x + b_t), \ t \in \{S,T\} \quad (1),$$

wherein "·" denotes a standard inner product in $R^m$, and $w_t$ and $b_t$ are parameters of the function. $b_t$ is a constant; therefore, equation (1) may also be simplified as:

$$f(x) = \text{sign}(w_t \cdot x), \ t \in \{S,T\} \quad (2).$$

According to the embodiments of the present disclosure, a classifier or transfer learning model for the target task T may be obtained by transferring knowledge about the prediction parameter $w_S$ from the task S to T. Here, without loss of generality, the prediction parameter $w_T$ for the target task T and the prediction parameter $w_S$ for the source task are expressed, respectively, as:

$$w_T = (w_{1,T}^{C=1}, w_{2,T}^{C=1}, \ldots, 2_{n_1,T}^{C=1}; w_{1,T}^{C=2}, w_{2,T}^{C=2}, \ldots, w_{n_2,T}^{C=2}; \ldots; w_{1,T}^{C=c}, w_{2,T}^{C=c}, \ldots, w_{n_c,T}^{C=c}) \quad (3)$$

$$w_S = (w_{1,S}^{C=1}, w_{2,S}^{C=1}, \ldots, 2_{n_1,S}^{C=1}; w_{1,S}^{C=2}, w_{2,S}^{C=2}, \ldots, w_{n_2,S}^{C=2}; \ldots; w_{1,S}^{C=c}, w_{2,S}^{C=c}, \ldots, x_{n_c,S}^{C=c}) \quad (4)$$

wherein C denotes subspaces from 1 to c, and $n_i$ denotes the number of dimensions of each subspace indexed by i, which number corresponds to the number of dimensions of each subspace resulting from the dividing of the input data.

In the document recommendation method according to the embodiments of the present disclosure, a more accurate document recommendation is realized through transferring "space importance," while the transfer of the "space importance" is realized by applying consistency subspace constraints of $|W_T^{C=1}| = |W_S^{C=1}|$, $|W_T^{C=2}| = |W_S^{C=2}|$, ..., $|W_T^{C=c}| = |W_S^{C=c}|$ in the optimization of the following problem, wherein it is assumed that the features in each corresponding subspace of the data for each task are identical:

$$\min_{w_S, w_T, \xi_T, \xi_S, a} \sum_{i=1}^{n_S} \xi_{S_i} + \sum_{i=1}^{n_T} \xi_{T_i} + \frac{\lambda}{2} \sum_{i=1}^{c} (a^i)^2 \quad (5)$$

$$\text{s.t.} \begin{cases} \xi_{S_i} \geq 0 \\ \xi_{T_i} \geq 0 \\ y_{T_i}(w_T x_{T_i}) \geq 1 - \xi_{T_i} \\ y_{S_i}(w_S x_{S_i}) \geq 1 - \xi_{S_i} \\ |w_T^{c=i}| = |w_S^{c=i}| = a^{c=i} \end{cases}$$

By substituting the constraints into expression (5), it may be further expressed as:

$$\min_{w_S, w_T, a} \sum_{i=1}^{n_S} \max(0, 1 - y_{S_i}(w_S x_{S_i})) + \sum_{i=1}^{n_T} \max(0, 1 - y_{T_i}(w_T x_{T_i})) + \frac{\lambda}{2} \sum_{k=1}^{c} (a^k)^2 \quad (6)$$

$$\text{s.t.} \sum_{j=1}^{n_k} (w_{j,S}^{C=k})^2 = \sum_{j=1}^{n_k} (w_{j,T}^{C=k})^2 = a^k,$$

$$k = 1, 2, \ldots, c$$

wherein $w_S$ and $w_T$ respectively denote the prediction vector for the source task and the prediction vector for the target task; $n_S$ denotes the number of available data (or eigenvectors) for the source domain of the source task; $x_{S_i}$ denotes the $i^{th}$ eigenvector for the source task; $y_{S_i}$ denotes an actual recommendation value of the $i^{th}$ document for the source task; $n_T$ denotes the number of available data (or eigenvector) for the target domain of the target task; $x_{T_i}$ denotes the $i^{th}$ eigenvector for the target task; $y_{T_i}$ denotes the actual recommendation value of the $i^{th}$ document for the task target; $\lambda$ is a constant; c denotes the number of divided subspaces; $n_k$ denotes the number of features in a portion corresponding to the $k^{th}$ subspace in the eigenvectors for the source task or the target task.

In the optimization expression (6), if the prediction vector $w_S$ denotes the prediction for the hyperplane of the target function $f_s$, then max $(0, 1 - y_{S_i}(w_S x_{S_i}))$ in the first term denotes the difference between the predicted value for point $x_{S_i}$ (corresponding to the data of a document, for example) in the source domain of the source task and the actual recommendation value $y_{S_i}$. If the vector $w_T$ denotes the predication of the hyperplane of the target function $y_{S_i}$, then max $(0, 1 - y_{T_i}(w_T x_{T_i}))$ in the second term denotes the difference between the predicted value for point $x_{T_i}$ (corresponding to one data record, for example, the data of a document) in the target domain of the target task and the actual recommendation value) $y_{T_i}$. The third term in the optimization is a regularized term. In the embodiments of the present disclosure, the regulation is performed by using the secondary norm $\Sigma_{i=1}^{c} a^i$ for the SVM classifier. In constraint conditions, it is required that variables for each class (i.e., each subspace) should have equal importance in the source domain and the target domain, wherein denotes the importance of the $i^{th}$ class ($i^{th}$ subspace) variable in the source domain (or target domain), and knowledge about the "subspace importance" is transferred through this variable. Solving expression (6) may be implemented through an existing optimization method (such as gradient Newton method), which will not be detailed herein for the sake of simplicity.

Figure 1B:
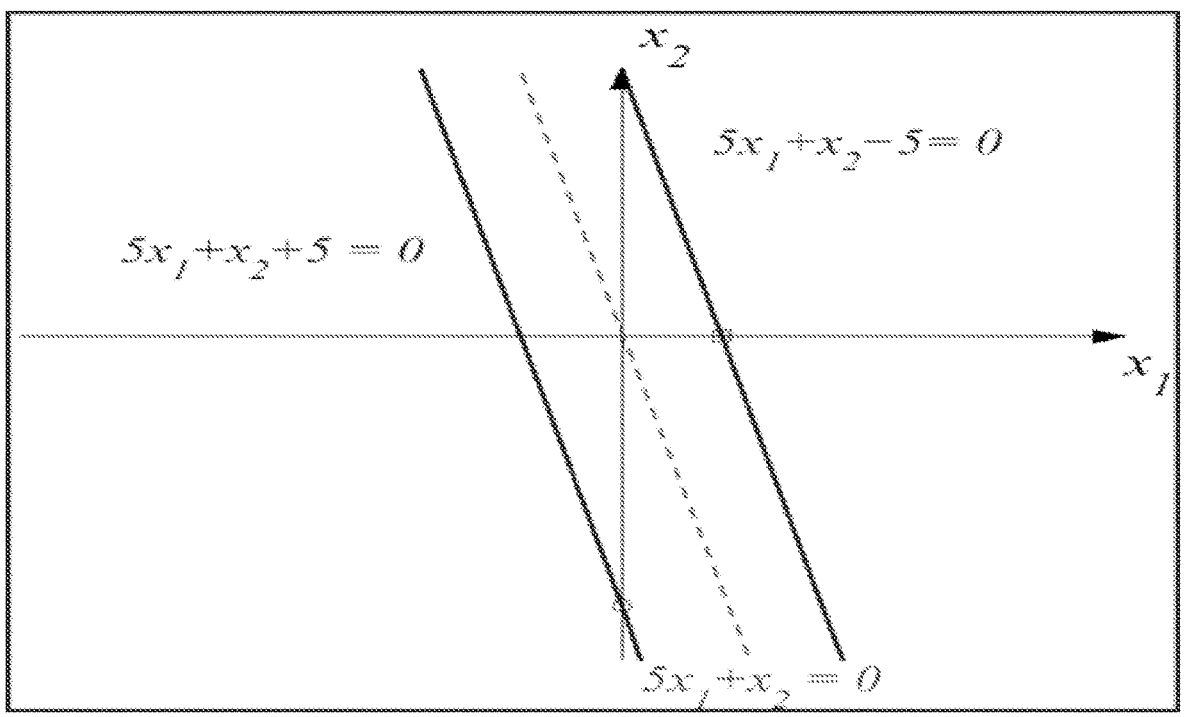

To facilitate better understanding, a binary example will be provided. For example, it is assumed that the source task and the target task both have two features [x1, x2], and they are labeled as ($x_1^{c=1}$; $x_2^{c=2}$) within the present transfer learning framework. At this point, the number of subspaces is 2. If the source task has $n_S=6$ data, i.e., there are 6 points $x_{S_i}=(i=1, 2, \ldots, 6)$ in the source domain, as shown in FIG. 1A, and the target task has $n_T=2$ data, i.e., there are 2 points (i=1,2) in the target domain, as shown in FIG. 1B, and substituting the values of respective points as shown in FIGS. 1A and 1B into expression (2), and optimizing expression (6) in the case of applying consistency constrains $|W_T^{C=1}|=|W_S^{C=1}|$ and $|W_T^{C=2}|=|W_S^{C=2}|$, it may be derived that the recommendation model for the source task is a hyperplane of $5x_1+(-1)x_2+5=0$, the source prediction vector $w_S=[5,-1]$ and the recommendation model for the target task is a hyperplane of $5x_1+1x_2=0$, the target prediction vector $w_T=[5,1]$ Online Recommendation Phase After obtaining the learned prediction vector $w_T$, i.e., after obtaining the hyperplane of the target prediction function $f_T$, document recommendation may be conducted. Still referring to the non-limiting examples as shown in FIGS. 1A and 1B for illustration, if the eigenvector extracted from a document is [2,0], the prediction value derived from computing the target function shown in FIG. 1B is $y=f_T(x)=\text{sign}(w_T \cdot x)=1$ and it may be determined that the document satisfies the user's preference based on that value, which may therefore be "recommended."

Besides, since the SVM per se is a natural confidence-based classifier, in the method according to the embodiments of the present disclosure, after obtaining the hyperplane as indicated by $w_T$ through learning, it may be decided, not only whether to make recommendation, but also a measure for the confidence of "should recommend" may be given. Specifically, for a document x, a score c for the confidence of recommending the document may be derived through calculating of $c=w_T \cdot x$. When it is required to generate a recommendation list, a document with a larger score c will be ranked higher in the recommendation list, i.e., the document may be recommended first.

Figure 2:
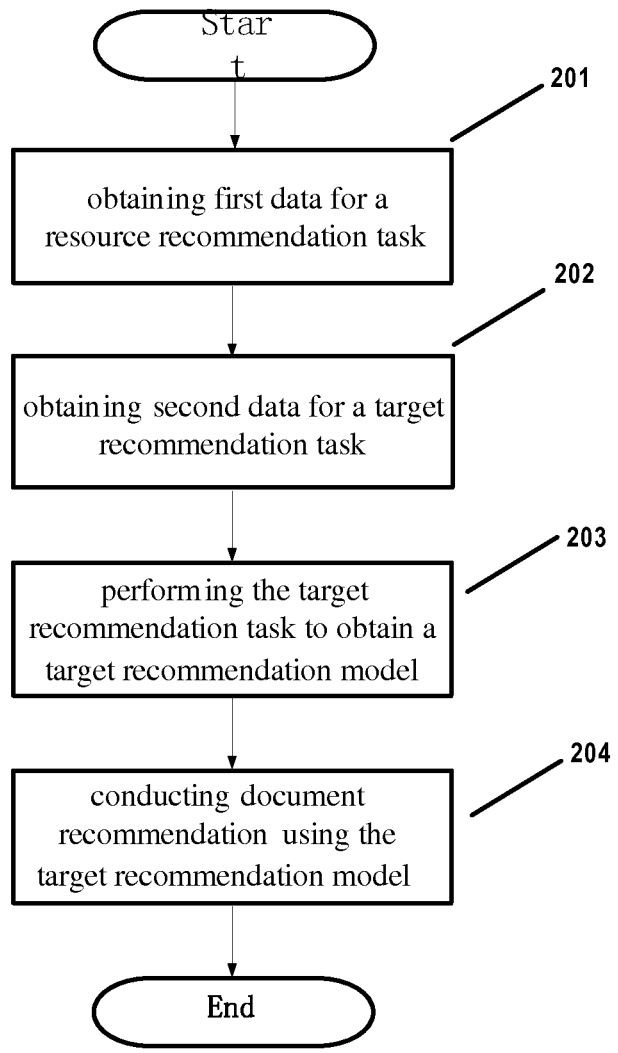
FIG. 2 shows an exemplary flowchart of a method 200 for document recommendation according to an embodiment of the present disclosure.

FIG. 2 shows an exemplary flowchart of a method 200 for document recommendation according to an embodiment of the present disclosure. As illustrated in FIG. 2, in block 201, a plurality of first data for a source recommendation task are obtained from activities related to a source user using a plurality of first documents; in block 202, a plurality of second data for a target recommendation task are obtained from activities related to a target user using a plurality of second documents; and in block 203, the target recommendation task is performed based on the plurality of first data, the plurality of second data, and knowledge transferred from the source recommendation task, so as to obtain a target recommendation model that may be a regularized transfer learning model as mentioned above. According to one embodiment of the present disclosure, the knowledge transferred from the source recommendation task includes information about subspace importance of the plurality of first documents. According to a further embodiment of the present disclosure, the source recommendation task comprises training a source prediction function ($f_S$) which is based on a source prediction vector ($w_S$) so as to obtain a source recommendation model. And the target recommendation task comprises training a target prediction function ($f_T$), which is based on a target prediction vector ($w_T$) so as to obtain a target recommendation model. According to yet a further embodiment of the present disclosure, the source prediction function and the target prediction function are support vector machine (SVM) linear classifiers. Finally, in block 204, document recommendation is conducted to a target user using the obtained target recommendation model.

Figure 3:
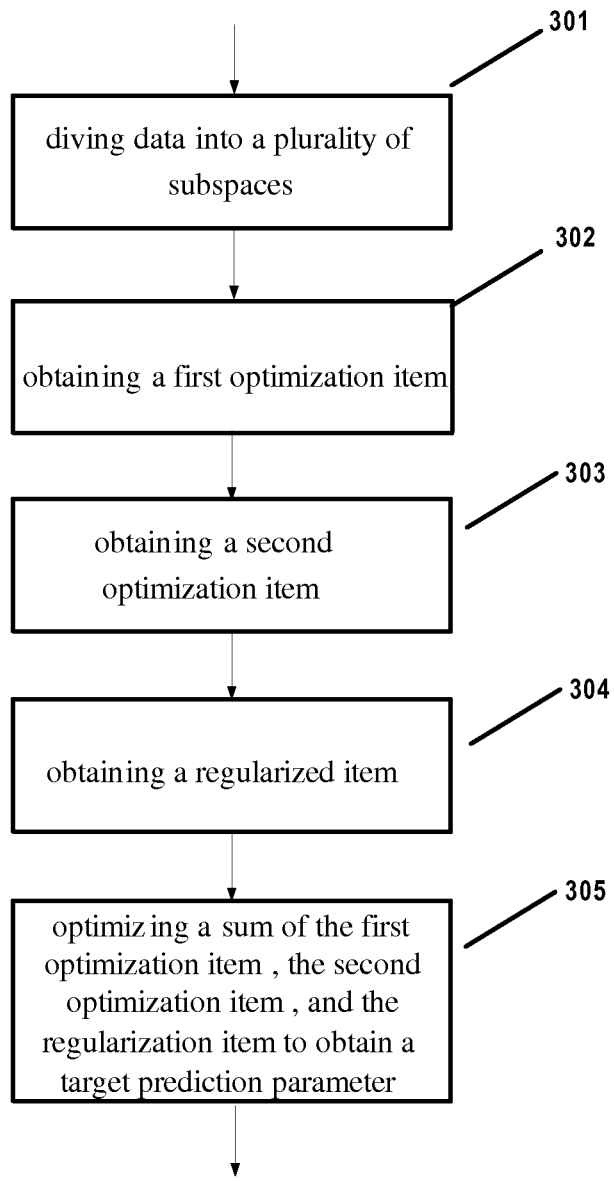
FIG. 3 shows an exemplary flowchart (in detail) for the step of generating a target recommendation model in the method 200 according to the embodiment of the present disclosure as shown in FIG. 2.

FIG. 3 shows an exemplary but more detailed flowchart of the step in block 203 of method 200 according to the embodiment of the present disclosure as shown in FIG. 2. As illustrated in FIG. 3, in block 301, respective data in the plurality of first data and the plurality of second data is divided into a plurality of subspaces; in block 302, a first optimization item is obtained, which is a sum of differences between a plurality of prediction values obtained by performing recommendation prediction on the plurality of first documents using the source prediction vector and corresponding actual recommendation values, respectively; in block 303, a second optimization item is obtained, which is a sum of differences between a plurality of prediction values obtained by performing recommendation prediction on the plurality of second documents using the target prediction vector and corresponding actual recommendation values, respectively; in block 304, a regularized item is obtained, which is an item obtained by regularizing the source prediction vector or the target prediction vector under a condition that a modulus value of a sub-vector of the source prediction vector for each subspace is equal to the modulus value of a sub-vector of a target prediction vector for this subspace; then, in block 305, a sum of the first optimization item, the second optimization item, and the regularized item is optimized to obtain a value of a target vector corresponding to the scenario wherein the aforesaid sum is minimal as a parameter for the target recommendation model.

Although the steps in respective blocks are depicted in an exemplary order as shown in FIGS. 2 and 3, the method according to the embodiments of the present disclosure is not limited by the order as shown, and any other order that may implement the method of the present disclosure falls within the protection scope of the present disclosure. For example, FIG. 3 shows blocks 302-304 in the order as illustrated, but the method according to the present disclosure may also be implemented by performing the steps in blocks 302-304 in a reverse order or in parallel.

Figure 4:
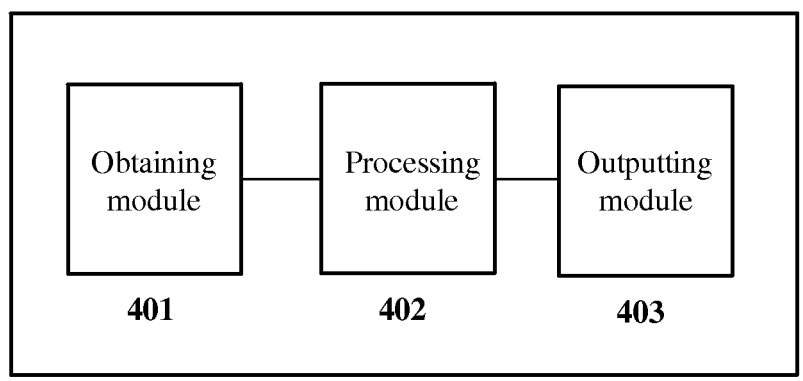
FIG. 4 shows an exemplary block diagram of an apparatus 400 according to an embodiment of the present disclosure.

FIG. 4 shows an exemplary block diagram of an apparatus 400 for document recommendation according to an embodiment of the present disclosure. As shown in FIG. 4, the apparatus 400 comprises: an obtaining module 401 configured to obtain a plurality of first data for a source recommendation task from activities related to a source user using a plurality of first documents, and to obtain a plurality of second data for a target recommendation task from activities related to a target user using a plurality of second documents; a processing module 402 configured to perform the target recommendation task based on the plurality of first data, the plurality of second data, and knowledge transferred from the source recommendation task to obtain a target recommendation model; and an outputting module 403 configured to conduct document recommendation to the target user using the target recommendation model, and to output a document recommendation result. Each of these modules, obtaining module 401, processing module 402 and outputting module 403, may exists separately or in combination of each other, for example the obtaining module and processing module forming a single unit, or all three modules being a single entity. Advantageously, each of these modules may exist as a standalone software module or a hardware module or a combination thereof.

Compared with the traditional document recommendation methods, the document recommendation method based on the transfer learning according to the embodiments of the present disclosure has the following advantages:

Without effort of the user, for example, editing of user's profiles, etc., a new user' preferences for documents may be predicted by automatically training a transfer learning model based on historical activity logs of old users;

Sufficient access log data of old users includes rich user behavior information and can facilitate more accurate prediction of the new user's preferences for documents;

By enabling each subspace of a data domain for a new user to have the same importance as the subspace of the old user, the new user's preferences for documents may be accurately determined;

When the new user does not have sufficient historical data, the method according to various embodiments of the present disclosure may solve the cold start problem in document recommendation.

The method according to various embodiments of the present disclosure standardize the document recommendation problem into a classification problem, which is effectively implemented by applying constraints called consistency subspace constraints to a traditional SVM classifier;

Parameters in the transfer learning optimization (problem) may be derived via the existing optimization problem solver/methodology (for example, the gradient Newton method);

With the parameters learned in the regularized SVM, recommendation scores may be computed for new documents and labeled as "recommended" or "not recommended." If a document list is given, the documents may be labeled and ordered using the document scores, so as to be recommended to users more conformably to users' preferences.

Although the document recommendation method based on the transfer learning has been depicted with the SVM classifier as an example, those skilled in the art would understand that the method of the present disclosure is not limited to the SVM, and may likewise be applicable to other linear or non-linear classifiers that may implement document classification.

The above depiction with reference to the drawings is merely provided exemplarily for illustrating the present disclosure. Those skilled in the art would appreciate that different steps or apparatus structures can be provided based on the above described principle of the present disclosure. Although these different steps or apparatus structures are not explicitly described or shown, they embody the principle of the present invention and are included within the spirit and scope of the present disclosure. Besides, all examples mentioned herein are mainly for teaching purposes so as to help readers understand the principle of the present disclosure and the concept contributed by the inventors to improve technical development in the field, and should not be interpreted as limitation to the scope of the present invention. Besides, all statements about the principle, aspects, and embodiments of the present disclosure and the specific examples as mentioned herein include their equivalents.

What is claimed is:

1. A method for document recommendation within a data storage system, using one or more processors and memory, comprising:

obtaining a plurality of first data for a source recommendation task from activities related to a source user using a plurality of first documents;

obtaining a plurality of second data for a target recommendation task from activities related to a target user using a plurality of second documents;

performing offline analysis of the plurality of first data, the plurality of second data and information transferred from the source recommendation task;

performing the target recommendation task based on the plurality of first data, the plurality of second data, and the information transferred from the source recommendation task to obtain a target recommendation model, wherein performing the target recommendation task comprises:

dividing at least a portion of respective data in the plurality of first data and the plurality of second data into a plurality of subspaces with one or more variables for each subspace; and optimizing the target recommendation task constrained by the one or more variables from one or more subspaces of the plurality of subspaces having equal importance in the plurality of first data and in the plurality of second data; and conducting document recommendation to the target user using the target recommendation model;

wherein the transferred information comprises subspace importance of the plurality of first documents.

2. The method according to claim 1, wherein:

the source recommendation task comprises training a source prediction function ($f_S$) based on a source prediction vector ($w_S$) to obtain a source recommendation model; and the target recommendation task comprises training a target prediction function ($f_T$) based on a target prediction vector ($w_T$) to obtain the target recommendation model.

3. The method according to claim 2, wherein performing the target recommendation task to obtain the target recommendation model further comprises:

obtaining a first optimization element that is a sum of differences between a plurality of prediction values obtained by performing recommendation prediction on the plurality of first documents using the source prediction vector and corresponding actual recommendation values, respectively;

obtaining a second optimization element that is a sum of differences between a plurality of prediction values obtained by performing recommendation prediction on the plurality of second documents using the target prediction vector and corresponding actual recommendation values, respectively;

obtaining a regularized element that is an element obtained by regularizing the source prediction vector or the target prediction vector under a condition that a modulus value of a sub-vector of the source prediction vector for each of the subspaces is equal to the modulus value of a sub-vector of the target prediction vector for that subspace; and optimizing a sum of the first optimization element, the second optimization element, and the regularized element to obtain a value of the target vector corresponding to the scenario wherein the sum is minimal as a parameter for the target recommendation model.

4. The method according to claim 3, further comprising:

generating a plurality of first eigenvectors ($x_{S_i}$) based on the plurality of first data;

generating a plurality of second eigenvectors ($x_{T_i}$) based on the plurality of second data; and optimizing the expression:

$$\min_{w_S, w_T, a} \sum_{i=1}^{n_S} \max(0, 1 - y_{S_i}(w_S x_{S_i})) +$$

$$\sum_{i=1}^{n_T} \max(0, 1 - y_{T_i}(w_T x_{T_i})) + \frac{\lambda}{2}\sum_{k=1}^{c} (a^k)^2$$

$$\text{s.t.} \sum_{j=1}^{n_k} (w_{j,S}^{C=k})^2 = \sum_{j=1}^{n_k} (w_{j,T}^{C=k})^2 = (a^k)^2,$$

$$k = 1, 2, \ldots, c$$

wherein $w_S$ and $w_T$ denote the prediction vector for the source task and the prediction vector for the target task; $n_S$ denotes the number of the plurality of first eigenvectors; $x_{S_i}$ denotes the $i^{th}$ first eigenvector; $y_{S_i}$ denotes an actual recommendation value for the $i^{th}$ document; $n_T$ denotes the number of the plurality of second eigenvectors; $x_{T_i}$ denotes the $i^{th}$ second eigenvector; $y_{T_i}$ denotes the actual recommendation value for the $i^{th}$ second document; $\lambda$ is a constant; c denotes the number of the subspaces; $n_k$ denotes the number of features in a portion corresponding to the $k^{th}$ subspace in the first eigenvectors, which is identical to the number of features in a portion corresponding to the $k^{th}$ subspace in the second eigenvectors.

5. The method according claim 4, wherein the source prediction function and the target prediction function are support vector machine linear classifiers.

6. An apparatus for document recommendation on a data storage system, using one or more processors and memory, comprising:

an obtaining module, implemented via the one or more processors, configured to obtain a plurality of first data for a source recommendation task from activities related to a source user using a plurality of first documents, and to obtain a plurality of second data for a target recommendation task from activities related to a target user using a plurality of second documents;

a processing module, implemented via the one or more processors, configured to perform the target recommendation task based on the plurality of first data, the plurality of second data, and information transferred from the source recommendation task to obtain a target recommendation model, wherein the processing module is further configured to:

divide at least a portion of respective data in the plurality of first data and the plurality of second data into a plurality of subspaces with one or more variables for each subspace; and optimize the target recommendation task constrained by the one or more variables from one or more subspaces of the plurality of subspaces having equal importance in the plurality of first data and in the plurality of second data;

wherein the processing module performs an offline analysis of the plurality of first data, the plurality of second data and the information transferred from the source recommendation task; and an outputting module configured to conduct document recommendation to the target user using the target recommendation model, and output a document recommendation result;

wherein the transferred information comprises subspace importance of the plurality of first documents.

7. The apparatus according to claim 6, wherein:

the source recommendation task comprises training a source prediction function ($f_s$) based on a source prediction vector ($w_S$) to obtain a source recommendation model; and the target recommendation task comprises training a target prediction function ($f_T$) based on a target prediction vector ($w_T$) to obtain the target recommendation model.

8. The apparatus according to claim 7, wherein the processing module is further configured to:

obtain a first optimization element that is a sum of differences between a plurality of prediction values obtained by performing recommendation prediction on the plurality of first documents using the source prediction vector and corresponding actual recommendation values, respectively;

obtain a second optimization element that is a sum of differences between a plurality of prediction values obtained by performing recommendation prediction on the plurality of second documents using the target prediction vector and corresponding actual recommendation values, respectively;

obtain a regularized element that is an element obtained by regularizing the source prediction vector or the target prediction vector under a condition that a modulus value of a sub-vector of the source prediction vector for each of the subspace is equal to the modulus value of a sub-vector of the target prediction vector for that subspace; and optimize a sum of the first optimization element, the second optimization element, and the regularized element to obtain a value of the target vector corresponding to the scenario wherein the sum is minimal as a parameter for the target recommendation model.

9. The apparatus according to claim 8, wherein the processing module is further configured to:

generate a plurality of first eigenvectors ($x_{S_i}$) based on the plurality of first data;

generate a plurality of second eigenvectors ($x_{T_i}$) based on the plurality of second data; and optimize the expression:

$$\min_{w_S, w_T, a} \sum_{i=1}^{n_S} \max(0, 1 - y_{S_i}(w_S x_{S_i})) +$$

$$\sum_{i=1}^{n_T} \max(0, 1 - y_{T_i}(w_T x_{T_i})) + \frac{\lambda}{2}\sum_{k=1}^{c} (a^k)^2$$

$$\text{s.t.} \sum_{j=1}^{n_k} (w_{j,S}^{C=k})^2 = \sum_{j=1}^{n_k} (w_{j,T}^{C=k})^2 = (a^k)^2,$$

$$k = 1, 2, \ldots, c$$

wherein $w_S$ and $w_T$ denote the prediction vector for the source task and the prediction vector for the target task; $n_S$ denotes the number of the plurality of first eigenvectors; $x_{S_i}$ denotes the ith first eigenvector; $y_{S_i}$ denotes an actual recommendation value for the ith document; $n_T$ denotes the number of the plurality of second eigenvectors; $x_{T_i}$ denotes the ith second eigenvector; $y_{T_i}$ denotes the actual recommendation value of the ith second document; $\lambda$ is a constant; c denotes the number of the subspaces; $n_k$ denotes the number of features in a portion corresponding to the $k^{th}$ subspace in the first eigenvectors, which is identical to the number of features in a portion corresponding to the $k^{th}$ subspace in the second eigenvectors.

10. The apparatus according to claim 9, wherein the source prediction function and the target prediction function are support vector machine linear classifiers.

11. The apparatus according to claim 6, wherein the obtaining module, the processing module and the outputting module comprise at least one of a hardware element and a software application and a combination thereof.

* * * * *